(12) United States Patent
Lefevre

(10) Patent No.: US 6,600,767 B1
(45) Date of Patent: Jul. 29, 2003

(54) FREE SPACE LASER WITH SELF-ALIGNED FIBER OUTPUT

(75) Inventor: Hervé Lefevre, Paris (FR)

(73) Assignee: Photonetics, Marly le Roi (FR)

( * ) Notice: Subject to any disclaimer, the term of this patent is extended or adjusted under 35 U.S.C. 154(b) by 0 days.

(21) Appl. No.: 09/359,714

(22) Filed: Jul. 23, 1999

(30) Foreign Application Priority Data

Jul. 27, 1998 (FR) .............................................. 98 09573

(51) Int. Cl.[7] ............................ H01S 3/30; H01S 3/098; H01S 3/08; H01S 3/082
(52) U.S. Cl. .............................. 372/108; 372/6; 372/18; 372/96; 372/97; 372/99; 372/107
(58) Field of Search ......................... 372/108, 99, 107, 372/96, 18, 6; 385/37

(56) References Cited

U.S. PATENT DOCUMENTS

| 4,642,809 | A | * | 2/1987 | Petheram ..................... 372/66 |
| 4,848,882 | A | * | 7/1989 | Suzuki et al. ............... 350/413 |
| 4,923,270 | A | | 5/1990 | Carter |
| 5,305,336 | A | * | 4/1994 | Adar et al. ................... 372/18 |
| 5,402,438 | A | | 3/1995 | Tanurma |
| 5,594,744 | A | | 1/1997 | Levevre et al. |
| 5,719,973 | A | | 2/1998 | Monroe et al. |
| 6,233,259 | B1 | * | 5/2001 | Ventrudo et al. ............... 372/6 |

FOREIGN PATENT DOCUMENTS

| DE | 3836377 | 5/1989 |
| EP | 0812040 A2 | * 10/1997 |
| EP | 812040 | 12/1997 |

OTHER PUBLICATIONS

Article by T.G. Kortenski et al. "Cavity–Taper Output Nd3+: YAG Laser" published in Optics Communications, vol. 74, No. 6, Jan. 15, 1990, pp. 370–373.
Article by V.P. Duraev et al. entitled "Single–Frequency Lambda=1.06 MUM Semiconductor Laser With a Distributed Bragg Mirror in an Optical Fibre" published in Quantum Electronics, vol. 28, No. 4, Apr. 1998, pp. 290–291.

* cited by examiner

Primary Examiner—Paul Ip
Assistant Examiner—Armando Rodriguez
(74) Attorney, Agent, or Firm—Arent Fox Kintner Plotkin & Kahn PLLC

(57) ABSTRACT

The present invention relates to a continuously tuneable free space laser. An amplifying medium in free space is placed inside a Fabry-Perot cavity consisting of two reflectors. One of these two mirrors being partially translucent and makes up the output mirror of the laser. According to the invention, the output mirror is inserted into the core of a monomode optic fiber that constitutes an output optic fiber and a lens placed in the Fabry-Perot cavity. This ensures coupling in this fiber of the luminous fluxes transmitted by the amplifying medium and the second reflector is self-aligned.

11 Claims, 4 Drawing Sheets

FREE SPACE LASER WITH SELF-ALIGNED FIBER OUTPUT

This invention relates to a free space laser with monomode fibre output that exhibits therefore the advantage of taking into account, by its very construction, coupling with a monomode optic fibre of the luminous flux transmitted. The very structure of these lasers enables self-alignment of the luminous flux transmitted by the amplifying medium in free space with the output monomode fibre. Thus, the advantages of free space lasers are combined to those of guided lasers coupled to a leading fibre and those of fibre lasers.

Free space lasers 1 are well known and consist of a Fabry-Perot cavity comprising two mirrors 3, 4 and an amplifying medium 2. These free space lasers of the previous art are represented diagrammatically on FIG. 1.

In order to enable transmission of a luminous flux 8, one of the mirrors 4 is partially translucent, and also to ensure stable resonance of the cavity, one of the mirrors at least is concave. Indeed, these free space lasers are generally configured to transmit over the non-guided fundamental lateral mode $TEM_{00}$ whose transversal intensity distribution is Gaussian in shape. This Gaussian mode of the laser can be coupled very efficiently in a monomode 6 whose guided mode has a shape very similar to a Gaussian. To do so, a lens 5 with focus distance f such that the waist of the converging beam exhibits the same length as the guided mode of the monomode fibre. The input face of the fibre is located on the focal plane of the lens and the core 7 of the fibre is centred on the waist of the convergent laser beam.

In order to enhance stability of the cavity, one of the mirrors 3 can be replaced with a self-aligned retroreflecting device such as a cube corner 9 or a cat's eye 10, respectively represented on FIGS. 2 and 3. In such a case, the cavity is always optimised, but the direction of the output beam 8 is given by the orientation of the mirror 4 facing the self-aligned retroreflector.

By self-aligned retroreflecting, we mean here a device designed for receiving a collimated incident beam and for sending it back in the form of a reflected beam, also collimated, whereas the reflected beam exhibits, at least in the first order, a direction parallel to that of the incident beam, even if the beam shows a small angular deviation with respect to its theoretical incidence direction. This is in particular the case of the cube corners that are orthogonal trihedra whose inner faces are retroreflecting. The best operation is obtained for an incident beam, more or less parallel to the diagonal of the cube whose trihedron forms an apex. It is also the case of the cat's eye consisting of a plane mirror arranged in the focal plane of a convergent lens. Best operation is obtained for an incident beam that is more or less parallel to the axis of the lens.

With these free space lasers, one of the mirrors can also be replaced with a wavelength dispersive retroreflecting system, comprising for instance a diffraction network 12 and a mirror 13; this is represented on FIG. 4. Such a device enables selection of a specific transmission wavelength, whereas the angular variation of the retroreflecting dispersive system enables providing a wavelength-tuneable laser.

For all these free space lasers, the output beam 8 can be coupled efficiently in a monomode fibre 6 if the laser also transmits in its fundamental mode $TEM_{00}$. We know that the coupling conditions in the fibre are optimum when the axis 14 of the output laser beam 8 is aligned with the axis 15 delineated by the centre of the lens and the centre of the core 7 of the fibre and when the output face 16 of the fibre is in the focal plane 17 of the lens. This appears for instance on the enlarged representation of FIG. 5.

The stability of the coupling and henceforth of the power transmitted depends therefore, in particular, on the stability of the lens-core axis 15, but also on the axis 14 of the output laser beam. However, this beam suffers from instabilities due to residual instabilities caused when aligning the laser mirrors. Stabilisation is possible with counter-reaction mechanisms acting on the orientation of the mirrors but leading to a system of significant complexity.

The purpose of the invention is to suggest a free space laser with a monomode fibre output that is self-aligned to eliminate these instabilities.

To this effect, the invention therefore relates to a free space laser comprising an amplifying medium, in free space, located inside a Fabry-Perot cavity, whereas two reflectors make up this cavity, one of both reflectors being partially translucent and constituting the laser output mirror.

According to the invention, the output mirror is inserted in the core of a monomode optic fibre that constitutes an output optic fibre; a lens, located in the cavity, ensures coupling in this fibre of the luminous fluxes transmitted by the amplifying medium and the second reflector is self-aligned.

Advantageously, in various embodiments, each exhibiting its own advantages and liable to be combined:
- the output mirror is a Brag network photo-inscribed in the core of the optic fibre;
- the self-aligned reflector is a cube corner;
- the self-aligned reflector is a cat's eye;
- the laser comprises means enabling to vary the transmission wavelength;
- the laser comprises means ensuring variation continuity of the transmission wavelength;
- the means ensuring variation of the transmission wavelength comprise a network operating in the Littman-Metcalf configuration;
- the lens has a zero frontal distance;
- the lens has an index gradient;
- as the amplifying medium exhibits plane interfaces with the free space, the planes of these interfaces are tilted with respect to the normal line of the laser axis.

The invention will be described more in detail with reference to the drawings on which:

Figure 1:
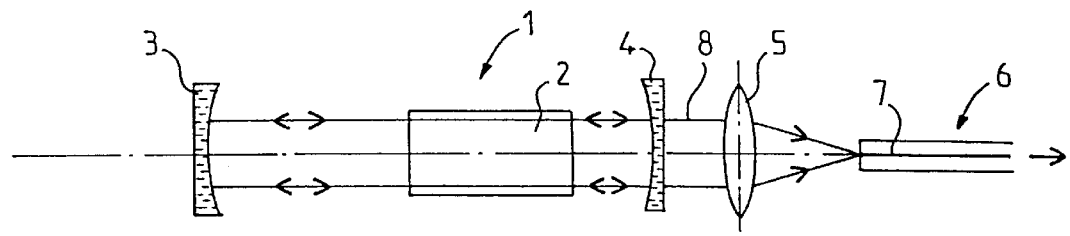
FIG. 1 represents the traditional structure of a free space laser of the previous art, coupled to a fibre.
Figure 2:
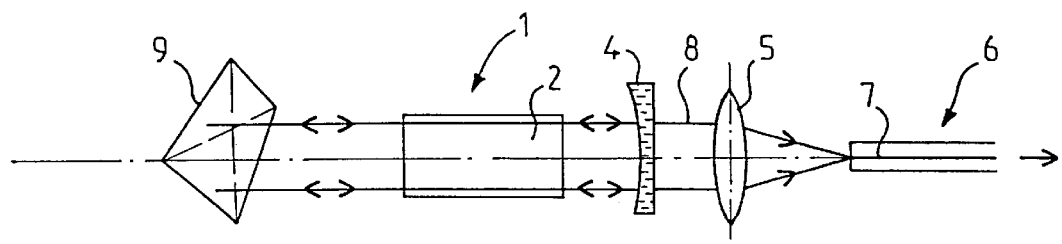
FIG. 2 represents the traditional structure of a free space laser of the previous art, stabilised with a corner cube and coupled to a fibre.
Figure 3:
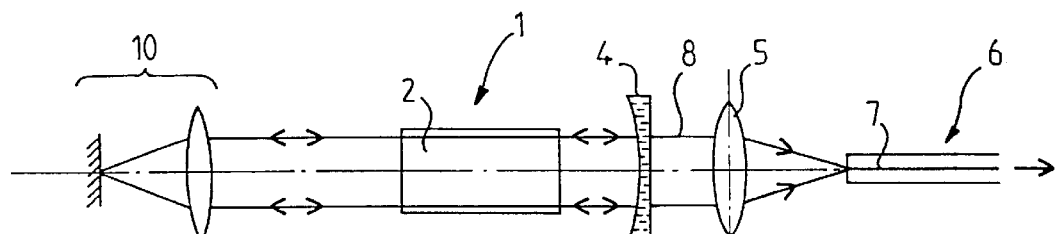
FIG. 3 represents the traditional structure of a free space laser of the previous art, stabilised with a cat's eye and coupled to a fibre.
Figure 4:
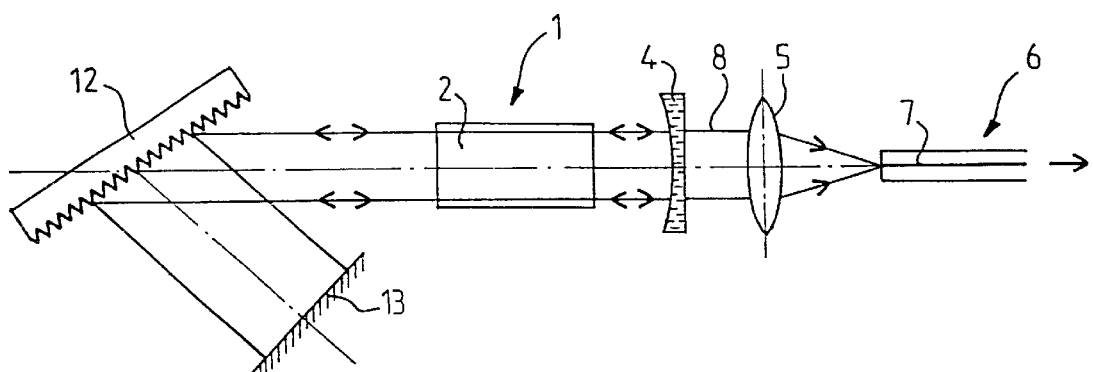
FIG. 4 represents the traditional structure of a tuneable free space laser of the previous art coupled to a fibre.
Figure 5:
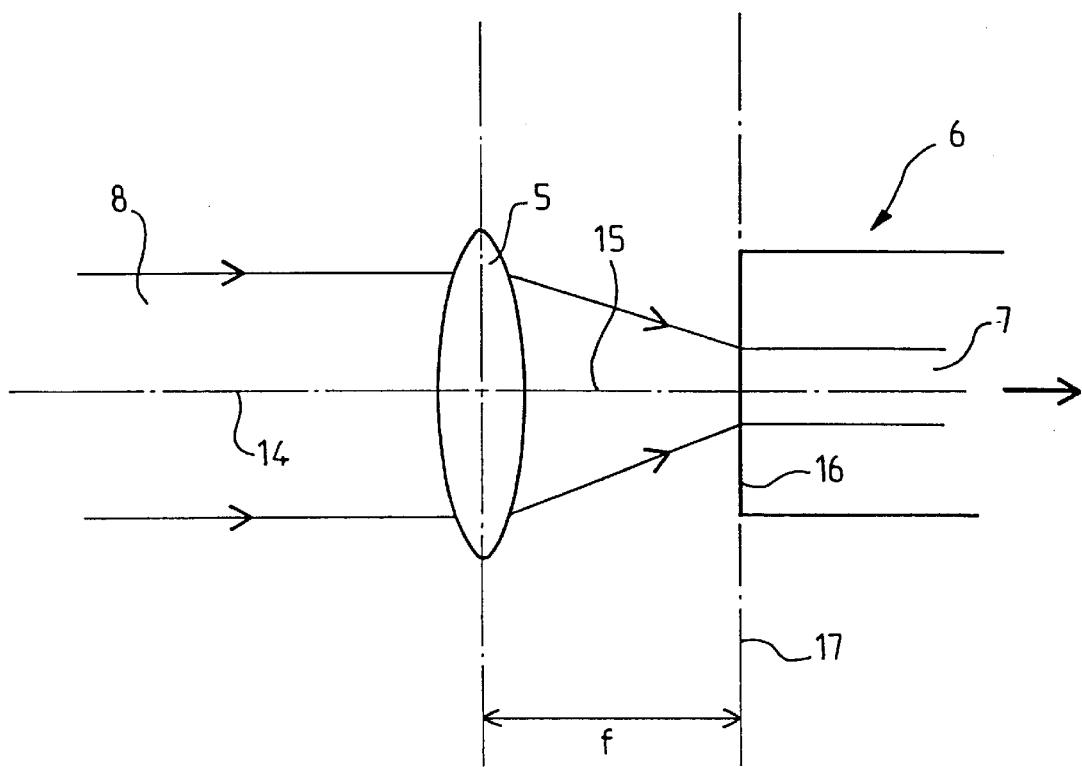
FIG. 5 is an enlarged representation of a beam transmitted by a free space laser of the previous art and coupled to a fibre.
Figure 6:
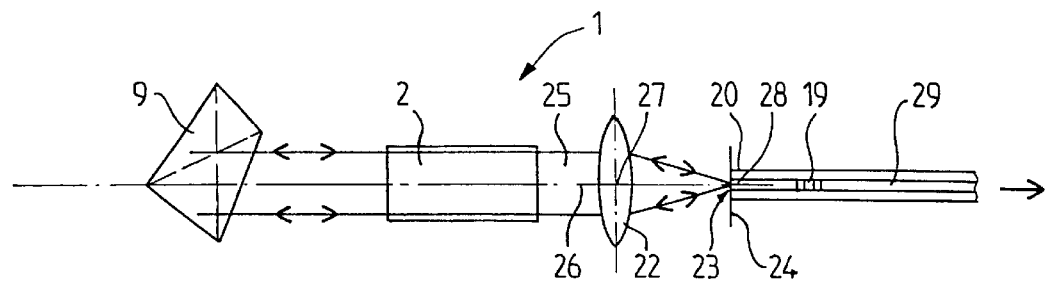
FIG. 6 represents the structure of a laser according to the invention.

We shall now refer to the FIG. 6 and following ones, on which the elements similar to those designated on the previous Figures have kept the same references; the laser 1 comprises a free space operating amplifying medium 2.

With 'free space operating', we mean here that the propagation is not guided in the amplifying medium. This distinguishes this laser category from guided lasers (solid state lasers or fibre lasers). Free space amplifying media are quite various and their technology is well mastered.

The laser 1 also comprises a cavity consisting, at one of its ends, of a self-aligned retroreflecting device 18. This self-aligned retroreflecting device 18 may consist of a cube corner 9 or a cat's eye, or still of any other device ensuring retroreflection of a luminous ray towards itself. The other mirror 19, making up the output mirror, partially translucent, is built inside the core 29 of a monomode fibre 20. Such a mirror can be provided in the fibre by different means, but preferably by photo-inscription of a Bragg network reflecting in the vicinity of the transmission wavelength of the laser. It can also be produced by surface metallization inside the fibre.

The monomode optic fibre 20, inside which the luminous flux transmitted by the laser is coupled, thus makes up its output fibre.

Inside the cavity, a convergent lens 22 is located so that the end 23 of the fibre 20 lies in the focal plane 24 of the lens 22. Thus, coupling in the fibre 20 of the collimated beams 25 transmitted and received by the amplifying medium 2 is performed with maximum efficiency. Moreover, the focal distance of the lens 22 has been selected so that the divergent beam originating from the fibre 20 is collimated with optimum diameter for the operation of the amplifying medium.

In this configuration, the axis 26 of the laser beam 25 in the cavity is given by the axis delineated by the centre 27 of the lens 22 and the centre 28 of the core 29 of the end of the monomode fibre 20.

The reflector 18 being self-aligned (it comprises a cube corner 9 or a cat's eye), the axis 26 of the laser beam 25 is determined by the axis linking the centre 27 of the lens 22 to the centre 28 of the core 29 of the fibre 20. Both these axes therefore overlap one another because of the very structure of the laser. The cavity is always optimised, even in the presence of alignment defects of the components of the laser and the coupling in the fibre is always optimal. The axis [centre of the lens-core of the fibre] always delineates the axis of the laser beam. We can thus obtain far simpler initial setting and better stability of the said setting in comparison to those of conventional devices.

Figure 7:
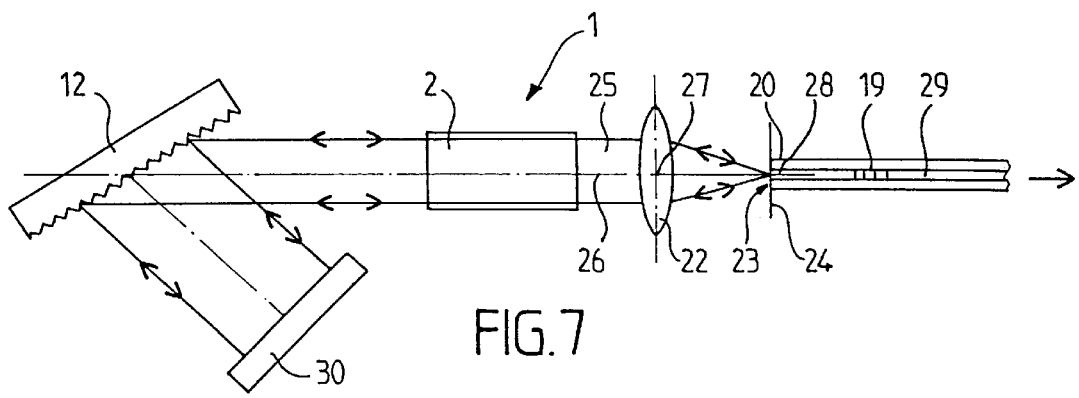
FIG. 7 represents the structure of a tuneable laser according to the invention.

FIG. 7 represents a laser according to the invention, tuneable using a diffraction network 12 and a Littman-Metcalf configuration reflector 30, such a configuration resorts to a self-aligned reflector 30 for the dimension perpendicular to the spectral dispersion plane. This reflector 30 can be a single dimension corner, i.e. an orthogonal dihedron whose faces are innerly reflecting or a single dimension cat's eye, i.e. a cylindrical lens associated with a plane mirror in its focal plane. Such an arrangement enables selection and variation of the transmission wavelength. Suitably co-ordinated movements of the network 12 and of the reflector 30 enable to vary the selected wavelength continuously, without any mode hopping.

With the laser according to the invention, the mirror 19 inserted into the core of the fibre is a photo-inscribed Bragg network. It can be 'chirped', with continuously variable steps, in order to widen the wavelength area for which it behaves as a partially reflecting mirror, and hence the spectral operating field of the laser.

Figure 8:
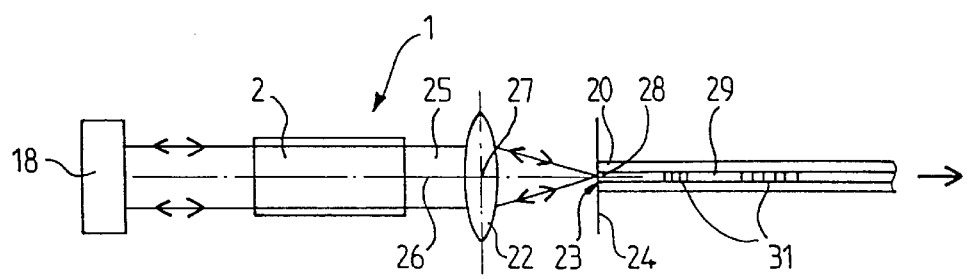
FIG. 8 represents the structure of a tuneable laser with a 'chirped' Bragg network according to the invention.

In the case of a tuneable laser where the cavity remains constant in length as the wavelength is changed, the variable step (chirped) network 31 can be optimized to ensure continuous tuneability, whereas the short wavelengths $\lambda$ are reflected at the beginning of the network and those longer $\lambda'$ are reflected further, while ensuring that the equivalent cavity length/wavelength ratio remains constant (FIG. 8). This is particularly well suited to the case when the selection and wavelength tuneability device is a passive Fabry-Perot interferometer placed inside the cavity.

Figure 9:
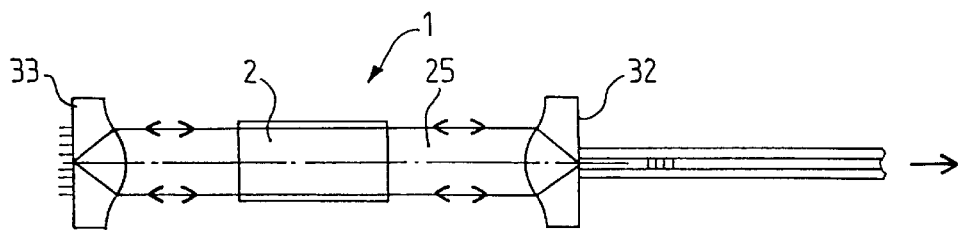
FIG. 9 represents the structure of a laser according to the invention, fitted with zero front lenses.
Figure 8A:
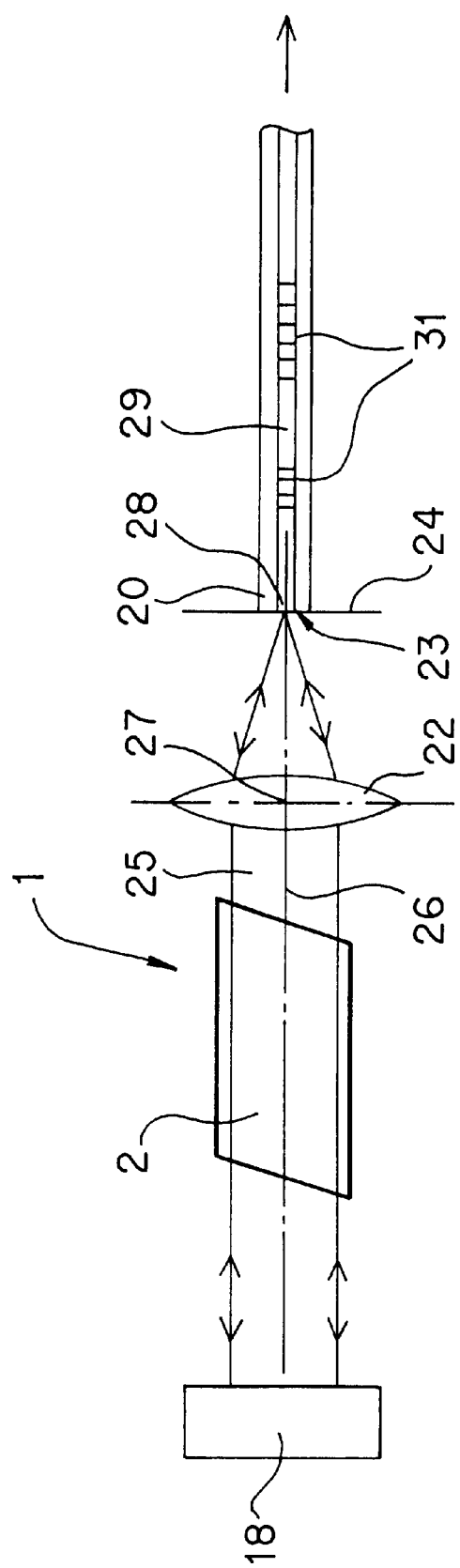

In the embodiment according to FIG. 9, the lenses, respectively 32 and 33, used for coupling in the fibre and for the cat's eye, have a zero front distance in order to avoid free space propagation of light when it is focused. Indeed, light density is then quite significant and free space dusts cold cause degradations. Such lenses can be for instance index gradient lenses.

The different intracavity interfaces, for example those delineating the amplifying medium 2 or the end of the fibre, are advantageously treated with an antireflection coating and/or tilted to avoid any retroreflections that would cause spurious sub-cavities.

When it is sought to generate high power luminous flux, the energy concentration at the input face 23 of the fibre 20 can be high itself and it might be damaged. This difficulty can be overcome by implementing means for enlarging the fibre mode. The fibre, in particular, may exhibit a conical core whose enlarged extremity ensures energy distribution over a greater surface.

Besides, in order to avoid negative effects of spurious reflections on the input face 23 of the fibre 20, the said fibre can be tilted with respect to the axis of the cavity.

The invention has been described with a monomode optic fibre, but it could be provided with any type of monomode optic guide.

In the case of an optically pumped amplifying medium, the pumping beam can be sent into the medium via the reflector 9 that would then be treated to transmit the pumping effect and to reflect the wave transmitted.

What is claimed is:

1. A free space laser comprising:
   an amplifying medium in free space, located inside a Fabry-Perot cavity;
   said cavity comprising two reflectors;
   one of said two reflectors is partially translucent and constitutes an output mirror of the laser;
   an output mirror is inserted into the core of a monomode optic fiber and constitutes an output optic fiber;
   a lens placed in said cavity ensures coupling in said optic fiber of the luminous fluxes transmitted by the amplifying medium; and
   one of said two reflectors is self-aligned;
   said lens having a zero front distance.

2. A free space laser according to claim 1 comprising an output mirror that is a Bragg network photo-inscribed in the core of said optic fibre.

3. A free space laser according to claim 1 comprising a self-aligning reflector that is a cube corner.

4. A free space laser according to claim 1 comprising a self-aligning reflector that is a cat's eye.

5. A free space laser according to claim 1 comprising a variable transmission wavelength.

6. A free space laser according to claim 5 comprising a transmission wavelength having variation continuity.

7. A free space laser according to claim 1 comprising a lens that is an index gradient lens.

8. A free space laser according to claim 1 comprising an output mirror formed by surface metallization inside said optic fibre.

9. A free space laser according to claim 1 comprising a self-aligned reflector that bends a luminous ray towards itself.

10. A free space laser according to claim 1 where said output mirror is inserted into the core of a monomode optic guide and constitutes an output optic guide.

11. A free space laser comprising:

an amplifying medium in free space, located inside a Fabry-Perot cavity and exhibiting plane interfaces with the free space;

said cavity comprising two reflectors;

one of said two reflectors is partially translucent and constitutes an output mirror of the laser;

an output mirror is inserted into the core of a monomode optic fiber and constitutes an output optic fiber;

a lens placed in said cavity ensures coupling in said optic fiber of the luminous fluxes transmitted by the amplifying medium; and said lens having a zero front distance;

one of said two reflectors is self-aligned; and wherein said planes of the interfaces are tilted with respect to a normal line of the laser axis.

* * * * *